Figure 1:
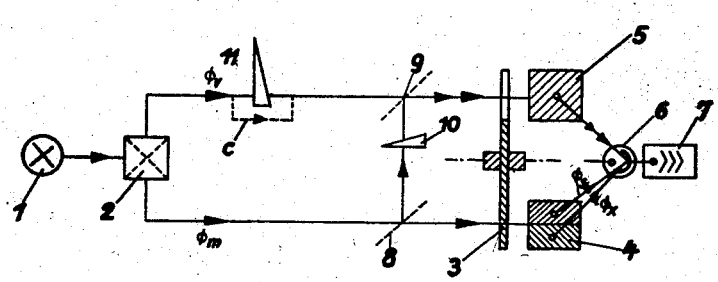

Feb. 24, 1959  L. LEITERER  2,874,606
DEVICES FOR MEASUREMENT OF TURBIDITY
Filed May 15, 1956

Inventor:
Dr. Lothar Leiterer

# United States Patent Office 2,874,606
Patented Feb. 24, 1959

2,874,606
DEVICES FOR MEASUREMENT OF TURBIDITY

Lothar Leiterer, Jena, Germany, assignor to VEB Carl Zeiss Jena, Jena, Germany

Application May 15, 1956, Serial No. 586,347

5 Claims. (Cl. 88—14)

The invention concerns a device for measuring turbidity, the standard of measurement of such turbidity being the Tyndall-stray-light caused by irradiation of the sample under examination. Measuring devices of this type are known, their method of operation being based on a comparison of the scattered light emanating from the test specimen with a reference light beam, e. g. the stray light caused by a reference body. If, however, it is required to determine very small degrees of turbidity by observation of the Tyndall-stray-light, serious difficulties arise owing to the great difference in luminosity existing between the Tyndall-stray-light and the primary light. This difference in luminosity presents a source of error because, through undesired and relatively slight reflection and deflection of the intensive primary beam from parts of the measuring apparatus, false stray light is produced which is capable of disturbing the measurements. On the other hand the test substance itself may have the property of introducing, as the result of some admixture, a turbidity component in addition to the turbidity to be measured and this, as a basic turbidity is superimposed on the turbidity to be measured. Thus, for example, in determinations of bacteria concentrations in liquid nutrient mediums, it may happen, that these mediums themselves possess a certain basic turbidity. Consequently, as regards the relation of bacteria concentrations to the turbidity, there are resulting in the range of small concentrations only very slight variations of turbidity as a function of the concentration, so that the relative measuring accuracy in this range must be considerably raised if the small concentrations are also to be determined with sufficient relative accuracy.

According to the invention these difficulties are eliminated in a device for measuring the turbidity operating on the principles mentioned by the provision of optical means for cancelling the effect of the false light, by which means a compensating beam of light is deviated from one of said beams and restored to one of said beams in such a proportion as to compensate the disturbing component in the measuring beam path. For example, this compensating light beam can be deflected by means of a partially transparent mirror out of the measuring beam and, by another partially transparent mirror, into the reference beam. A compensating device, for example a neutral grey wedge, can be introduced in the compensating ray path and the compensating light beam can thereby be so regulated that it exactly balances the disturbing component. Whether the measuring arrangement is placed in the reference ray path or in the measuring ray path, this type of compensation has been proved to be independent of the actual measuring procedure.

Figure 2:
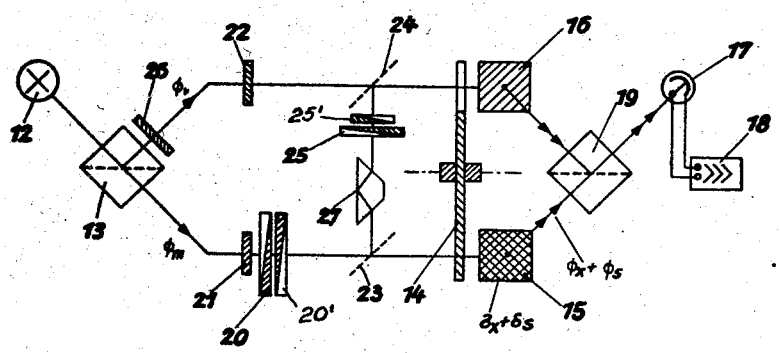

The invention is illustrated by two figures, Fig. 1 showing by means of a diagram the principle of the invention for compensation of disturbing light, and Fig. 2 showing an example, also diagrammatic, of the construction of a turbidity measuring device according to the invention, to be used for microbiological work.

In the diagram in Fig. 1 showing the familiar two-beam compensation apparatus with a rotating diaphragm for generating a flickering beam, the light from a light source 1 is split up by a beam splitter 2 into a measuring beam which passes through the specimen to be measured 4 by way of a modulating diaphragm 3, and a reference beam which, also through the diaphragm 3, is directed through a reference scattering body 5. Part of the stray light from the specimen 4 and the reference scattering body 5 falls on to a common photocell 6 which is connected to the input of an amplifier 7. Now, as soon as any additional stray effect appears from the specimen 4 or parts of the apparatus near it, besides the turbidity which is to be measured, there are two beams of stray light, viz. $\phi_x$ (measuring light) and $\phi_s$ (disturbing light) reaching the photocell 6 from 4. According to the invention a partial light beam will be deviated from the measuring ray path by a partially permeable mirror 8 directed to the reference ray path by way of the partially permeable mirror 9. In this way a second, additional light beam will fall on to the photocell 6 from the reference scattering body 5 also, and in its turn will be so regulated by an optical balance in the form of, say, a neutral grey wedge 10 in the transverse ray path between 8 and 9, that it exactly compensates the disturbing component $\phi_s$. This compensation may be performed with a specimen having the turbidity O. The compensation is obtained when the indicating instrument connected in the output of amplifier 7 shows no deflection. As may be shown this compensation is independent of the actual measuring procedure. The arrangement for reading the measured values may be coupled with another neutral grey wedge 11 in the reference ray path. Alternatively it is also possible to arrange the grey wedge 11 in the ray path of the specimen.

There are, however, other forms of compensation for the disturbing component which are possible. All that it is necessary to observe is that the compensation must be independent of the variable quantities of the device. Thus it is also possible, as shown in Fig. 1 by the dotted line c, for part of the reference light beam to make a simple deviation round the grey wedge 11 if this is on the reference side. The new principle is also applicable to the process in which there is equal light and two cells. In this case the supplementary light stream would have to be taken to the reference cell.

Another advantage of the method of compensating disturbing light according to the invention passes into the sphere of closed-loop control systems. If, for example, there is a self-compensating photometer, this will have, like other self-compensating instruments, a maximum adjusting accuracy which, for the sake of compensation without oscillation, cannot be exceeded. A slight deviation of the measuring grey wedge with respect to the position in which compensation is reached will effect both $\phi_x$ and $\phi_s$, in case the grey wedge is arranged in the ray path of the specimen. But simply the alteration of $\phi_x$ gives rise to a corresponding signal at the amplifier output, which has a retroactive effect on the measuring grey wedge, because the alteration of $\phi_s$ is balanced by an equal alteration on the reference side. If, on the other hand, there was no compensation for disturbing light, the output signal—and hence also the retroactive effect on the measuring grey wedge—would, for equal sensitivity of the amplifier, be higher by the factor $$\frac{\phi_x + \phi_s}{\phi_x}$$

This means, however, that the limiting sensitivity, i. e. the measuring accuracy attainable for $\phi_x$, would be lower, by this factor, than is the case with disturbing light compensation.

In the case of arrangements where the measuring grey wedge lies in the reference ray path the consideration leads to the same result.

Thus, with disturbing light compensation, the maximal measuring accuracy of a self balancing photometer is fundamentally higher by the factor $$\frac{\phi_x + \phi_s}{\phi_x}$$

than it would be, under the same conditions, without it.

Fig. 2 shows how the invention can be applied in the case of a nephelometer for microbiological purposes. Here too, the light from a source 12 is split up by a beam splitter 13 into a measuring beam path and a reference beam path, which are directed by way of a modulation diaphragm 14 and the test specimen 15, or a reference body 16, on to a photocell 17 acting as a radiation receiver, which is connected to the input of an amplifier 18. In this arrangement a ray fusion cube 19 serves to bring both beams on to the photocell 17 in the same direction. A pair of neutral grey wedges 20, 20' is provided in the measuring beam and acts as a continuous measuring arrangement embracing two decades. Furthermore, a light absorbing filter 21 may be inserted alternatively in this path, the introduction of which brings the measuring range up by one decade. The light beam $\phi_x$ maintains a constant value within the entire measuring range of these three decades. In this way the relative measuring accuracy for the determination of bacteria concentrations is also continuously constant in this range. It may be assumed as an example that it is 1% of any given measured value. To extend the measuring range downwards by a tenth power a fixed light absorbing filter 22 can be interposed. Of course, if this filter is used the measuring error is increased to 10% if the sensitivity of the receiver-amplifier arrangement is not increased at the same time.

The fixing of the light dividing ratios of the mirrors 23 and 24 is dependent upon the maximal basic turbidity, which has to be compensated, the relation of the light flux in the reference beam to that in the measuring beam $$\left(\frac{\phi_v}{\phi_m}\right)$$

directly behind the beam splitter 13, and the maximal transmission factor of the compensating organ 25, 25'. The division of the beam in 13 can be effected very well by the natural reflection at a glass-air surface. In this case of course an auxiliary light absorbing filter 26 must be placed in the reference ray path in order to achieve a very small ratio $$\left(\frac{\phi_v}{\phi_m}\right)$$

In conclusion the following important condition must be mentioned. If the smallest absolute variation of $\phi_x$ to be established with the apparatus is only a small fraction of the maximal disturbing light beam which must be reckoned with, then it is a case of a very clear compensation of the disturbing light beam. Here, this condition does not refer only to the intensities of the light beams after any complete fading-in of the beams to the peak values by means of the modulation diaphragm 14, but also to the instantaneous values of the light beams during the fade-over of the modulation diaphragm. The compensation condition for the peak values can be fulfilled exactly enough by means of the compensating organ 25, 25'. However, for the temporal course of the fade-over the decisive factor is the distribution of illumination intensity in the plane of the modulation diaphragm 14. But, since the ratio of the compensating light beam to the basic light beam in the reference ray path varies very considerably with variations in the measured values, and this may be between values which are sometimes much less and sometimes much more than one, the sum light distribution, for different light distribution of the two components, would still be an appreciable function of the measured value and the effective light concentration point of the total illumination intensity would be capable of variation during the measurements. Under such conditions, however, no perfect compensation is possible any longer. Fade-over impulses occur and these may lead to false signals which are sometimes equal in phase and frequency to the measuring signal at the output of the amplifier. It is necessary, therefore, to bring the compensating light beam into the reference beam in such a way that the corresponding partial images belonging to the two partial light beams, from the light source and the entry pupil (condenser) coincide with regard to size, position and orientation. This means to say that, in the first place there must be an image-transposing optical system containing in the transverse beam which serves for compensation, so that the difference in the length of the light paths is balanced; and in the second place, if the nature of the light divider 13 in Fig. 2 leads to one reflection more in the reference beam than there is in the measuring beam, this difference must be allowed for by an uneven number of supplementary reflections, for example, by means of a Dove prism 27 in the transverse ray path.

I claim:

1. A device for measuring the turbidity of a test specimen by means of scattered light, comprising means for deriving from a common light source a reference light beam and a measuring light beam, the specimen to be tested being arranged in said measuring light beam and a reference body in said reference light beam, means for comparing the scattered light emanating from said specimen with said reference light beam, said scattered light containing a disturbing component which is not intended to be measured, and optical means by which a compensating beam of light is deviated from one of said beams and added to the other of said beams in such a proportion as to compensate the disturbing component in the path of said measuring light beam.

2. A device for measuring the turbidity of a test specimen by means of scattered light, comprising means for deriving from a common light source a reference light beam and a measuring light beam, the specimen to be tested being arranged in said measuring light beam and a reference body in said reference light beam, means for comparing the scattered light emanating from said specimen with said reference light beam, said scattered light containing a disturbing component which is not intended to be measured, and optical means by which a compensating beam of light is deviated from one of said beams and added to the other of said beams in such a proportion as to compensate the disturbing component in the path of said measuring light beam, said compensating light beam being adjustable by means of a compensating device, e. g. a neutral grey wedge.

3. A device for measuring the turbidity of a test specimen by means of scattered light, comprising means for deriving from a common light source a reference light beam and a measuring light beam, the specimen to be tested being arranged in said measuring light beam and a reference body in said reference light beam, a rotating modulation diaphragm, a photoelecric cell connected to the input of an electronic amplifier, said modulation diaphragm being arranged in said reference and said measuring light beam so as to produce alternating intensity variations of said light beams which are directed onto said photoelectric cell for comparing the intensity of the scattered light emanating from said specimen with the intensity of said reference light beam, said scattered light containing a disturbing component which is not intended to be measured, and optical means by which a compensating beam of light is deviated from one of said beams and added to the other of said beams in such a proportion as to compensate the disturbing component in the path of said measuring light beam.

4. A device for measuring the turbidity of a test specimen by means of scattered light, comprising means for deriving from a common light source a reference light beam and a measuring light beam, the specimen to be tested being arranged in said measuring light beam and a reference body in said reference light beam, a rotating modulation diaphragm, a photoelectric cell connected to the input of an electronic amplifier, said modulation diaphragm being arranged in said reference and said measuring light beam so as to produce alternating intensity variations of said light beams which are directed onto said photoelectric cell for comparing the intensity of the scattered light emanating from said specimen with the intensity of said reference light beam, said scattered light containing a disturbing component which is not intended to be measured, and optical means by which a compensating beam of light is deviated from one of said beams and added to the other of said beams in such a proportion as to compensate the disturbing component in the path of said measuring light beam, each of said three beams producing in the plane of said modulating diaphragm an image originating from said common light source, an image transposing optical system being arranged in the path of said compensating light beam and bringing to coincidence the distribution of illumination intensity of said two images produced by said reference light beam and said compensating light beam.

5. A device for measuring the turbidity of a test specimen by means of scattered light, comprising means for deriving from a common light source a reference light beam and a measuring light beam, the specimen to be tested being arranged in said measuring light beam and a reference body in said reference light beam, means for adjusting the intensity of light in said reference light beam, means for comparing the scattered light emanating from said specimen with said reference light beam, said scattered light containing a disturbing component which is not intended to be measured, and optical means by which a compensating beam of light is deviated from said reference light beam and by-passing said light adjusting means added to the same beam in such a proportion as to compensate the disturbing component in the path of said measuring light beam.

References Cited in the file of this patent

UNITED STATES PATENTS

| | | |
|---|---|---|
| 2,045,124 | Cummins et al. | June 23, 1936 |
| 2,436,262 | Miller | Feb. 17, 1948 |
| 2,486,622 | White | Nov. 1, 1949 |